United States Patent
Froc et al.

(10) Patent No.: US 9,166,691 B2
(45) Date of Patent: Oct. 20, 2015

(54) METHOD FOR COUPLING AN EMITTING DEVICE TO A FREQUENCY SPLITTER IN AN OPTICAL PASSIVE NETWORK

(75) Inventors: Gwillerm Froc, Rennes Cedex (FR); Christophe Mangin, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 126 days.

(21) Appl. No.: 13/993,329

(22) PCT Filed: Dec. 9, 2011

(86) PCT No.: PCT/EP2011/072365
§ 371 (c)(1),
(2), (4) Date: Jun. 12, 2013

(87) PCT Pub. No.: WO2012/080138
PCT Pub. Date: Jun. 21, 2012

(65) Prior Publication Data
US 2013/0279906 A1 Oct. 24, 2013

(30) Foreign Application Priority Data
Dec. 17, 2010 (EP) .................................... 10195695

(51) Int. Cl.
*H04B 10/27* (2013.01)
*H04B 10/073* (2013.01)
(Continued)

(52) U.S. Cl.
CPC ............ *H04B 10/27* (2013.01); *G02B 6/29398* (2013.01); *H04B 10/0731* (2013.01); *H04J 14/0246* (2013.01); *G02B 6/2935* (2013.01); *G02B 6/2938* (2013.01)

(58) Field of Classification Search
CPC .............. H04J 14/0022; H04J 14/0209; H04J 14/0216; H04J 14/0279
See application file for complete search history.

(56) References Cited

U.S. PATENT DOCUMENTS

| 5,978,114 A | 11/1999 | Clark et al. |
| 2002/0067881 A1* | 6/2002 | Mathis ............................ 385/24 |

(Continued)

FOREIGN PATENT DOCUMENTS

| CN | 101 324 443 | 12/2008 |
| EP | 1 380 865 | 1/2004 |
| WO | 99 12296 | 3/1999 |

OTHER PUBLICATIONS

Li. Y. P. et al., "Silica-based Optical Integrated Circuits", IEE Proceedings: Optoelectronics, Institution of Electrical Engineers, vol. 143, No. 5, pp. 263-280, XP006006672, ISSN: 1350-2433 (Oct. 22, 1996).

(Continued)

*Primary Examiner* — David Payne
*Assistant Examiner* — Casey Kretzer
(74) *Attorney, Agent, or Firm* — Oblon, McClelland, Maier & Neustadt, L.L.P.

(57) ABSTRACT

A device and method to allow to estimate drift induced by temperature variation in a network including a frequency splitter based on a Mach-Zehnder, or alike component, and to track it over time, by adding mirrors to the unused port of the Mach-Zehnder components. Doing so, both OLT and ONU are able to scan a band of frequencies. The frequency corresponding to the nominal wavelength of the component will be reflected on the other port on the same side of the Mach-Zehnder while other frequencies will go through the Mach-Zehnder to be reflected by the mirror and come back to the emitter. By measuring the reflected signal while scanning frequencies, the actual nominal wavelength of the component can be determined.

9 Claims, 4 Drawing Sheets

(51) Int. Cl.
*H04J 14/02* (2006.01)
*G02B 6/293* (2006.01)

(56) References Cited

U.S. PATENT DOCUMENTS

| | | |
|---|---|---|
| 2003/0035446 A1* | 2/2003 | Griffel .......................... 372/20 |
| 2004/0022493 A1 | 2/2004 | Takiguchi et al. |
| 2004/0208523 A1 | 10/2004 | Carrick et al. |

OTHER PUBLICATIONS

Yamada, H., et al., "Si Photonic Wire Waveguide Devices", IEEE Journal of Selected Topics in Quantum Electronics, IEEE Service Center, vol. 12, No. 6, pp. 1371-1379, XP011151878, ISSN: 1077-260X, (Nov. 1, 2006).

International Search Report issued Jan. 19, 2012 in PCT/EP11/072365 filed Dec. 9, 2011.

* cited by examiner

METHOD FOR COUPLING AN EMITTING DEVICE TO A FREQUENCY SPLITTER IN AN OPTICAL PASSIVE NETWORK

The present invention generally relates to a passive optical network or PON and 5more precisely to a device and a method to finely adapt to relative wavelength drift due to temperature evolution in a network comprising a frequency splitter based on Mach-Zehnder frequency splitter or alike.

Passive optical networks are increasingly used to give network access to residential users or ensure mobile backhauling for instances. FIG. 1 illustrates their architecture. A head end 1.1, called an OLT for Optical Line Terminal, is connected to the core network and is connected to a plurality of ONUs for Optical Network Units aimed to be located at the end user location. In earlier implementation, the PON is based on the transmission of an optical signal using a single wavelength band distributed by a power splitter 1.3 to a few, typically 64, ONU. The power splitter 1.3 is a passive splitter that separates the input signal into a plurality of corresponding signals which power is divided by the number of branches. The transmission is typically bidirectional using two different wavelengths for the downlink and the uplink.

In an attempt to increase the number of ONUS to be served by one OLT, WDM for Wavelength Division Multiplexing technologies have been developed. These technologies take advantage of multiplexing several signals using different wavelengths on a single Fiber. Frequency splitter, equipment 1.2 on the figure, is then necessary to separate the different wavelengths before the power splitter 1.3. This equipment is referred as a frequency splitter. Different techniques could be used to achieve the frequency splittering. We can cite thin films based systems, interference cavities as AWG for Array Wavelength Gratings and FBG for Fiber Bragg Gratings. We focus on this later in this document.

Wavelength extraction from an optical signal based on Fiber Bragg Gratings is done using the so-called Mach-Zehnder components. Such a component is illustrated on FIG. 2. It is constituted of four ports 2.1, 2.2, 2.3 and 2.4. Two Bragg filters of the same nominal wavelength are used inside. It works as an Add Drop Optical Multiplexer. Port 2.1 acts as the input to receive an input signal typically multiplexing several bands using different wavelengths. Port 2.2 is an extracting port to output the band of the signal corresponding to the nominal wavelength of said Mach-Zehnder component. Port 2.4 acts as the output, output signal being the input signal but the extracted band. Port 2.3 acts as an add port, a band of the nominal wavelength can be added to the input signal using the port 2.3. The component acts symmetrically in the other direction with the input port being the port 2.4, the output being the port 2.1, the drop port is then the port 2.3 and the add port is the port 2.2. Symmetrically again, any signal which wavelength is different from the nominal wavelength and inserted on either add drop port will go through the component and exit on the other add drop port. For example, a signal of wavelength different from the nominal ones inserted on port 2.2 will output unchanged on port 2.3.

Depending on the number of wavelength bands multiplexed in the signal, the optical filtering can be done by several Mach-Zehnder components daisy chained. Each of the components drops one of the wavelengths from the input signal depending on its own nominal wavelength. We call nominal wavelength of a Mach-Zehnder component or of a FBG, the wavelength for which the component is reflexive.

The nominal wavelength of a Mach-Zehnder component depends on the nominal wavelength of the two Fiber Bragg Gratings used inside. One can achieve good granularity of the extracted signal of a few GHz. The nominal wavelength of a FBG depends on the particular pattern imprinted in the core of the Fiber and the operating temperature of the component. Depending on the temperature the nominal wavelength of a FBG moves. Typically for a temperature in a range from −40° to 80° centigrade the nominal wavelength can moves from −0.6 nm to +0.6 nm which corresponds to a frequency jitter over a band of almost 200 GHz. The terminal equipment being also typically in a non controlled environment they could be subject to similar drifts.

For that reason, these components are usually used in a temperature-controlled environment. For flexibility in the network deployment and cost reason it would be advantageous to get rid of this constraint.

The invention aims to solve these problems by devices and methods to allow to estimate the drift induced by temperature variation in a network comprising a frequency splitter based on a Mach-Zehnder, or alike component, and to track it over time. It is based on adding mirrors to the unused port of the Mach-Zehnder components. Doing so, both OLT and ONU are able to scan a band of frequencies. The frequency corresponding to the nominal wavelength of the component will be reflected on the other port on the same side of the Mach-Zehnder while other frequencies will go through the Mach-Zehnder to be reflected by the mirror and come back to the emitter. By measuring the reflected signal while scanning frequencies, the actual nominal wavelength of the component can be determined.

The invention concerns a device aimed to be used as a frequency splitter comprising at least one component with a Mach-Zehnder topology. In case of several, the components are daisy chained; each component with a Mach-Zehnder topology comprising one input port to receive an input signal typically multiplexing several bands using different wavelengths; one extracting port to output the band of the signal corresponding to the nominal wavelength of said component; one output port to output the input signal but the extracted band, this output port being connected to the input port of next component if any or being unused for the last component of the chain or the only component and one add port which is unused wherein all unused ports are equipped with a reflecting means.

The invention further concerns a method for coupling an emitting device to a frequency splitter as described, said emitting device being connected to the input port or the extracting port of one of the components with a Mach-Zehnder topology, said emitting device operating using one operating level or a set of operating levels, comprising for the emitting device a step of initializing its operating level to a first wavelength; a step of sending a signature signal using its operating level; a step of measuring the power of the returned signal to estimate the presence of a reflection signal; these steps being repeated over a band of operating levels and further comprising a step of determining the operating level, or the set of operating levels, for which the power of the returned signal is minimum and a step of setting the operating level, or the set of operating levels, to the determined operating level, or operating levels, for which the power of the returned signal is minimum.

In a particular embodiment, the measure of the power of the returned signal is done by modulation and filtering.

In a particular embodiment, the measure of the power of the returned signal is done by synchronous detection.

In a particular embodiment, the step of measuring the power of the returned signal comprises a step of definition of a temporal sliding window; a step of measuring the power of the return signal on the temporal sliding window; a step of moving the sliding window in a range within the one from origin to a maximum corresponding to the round trip time of the total transmission path coupled with a gain to get the expected signal.

In a particular embodiment, the width of the temporal sliding window is chosen to be the duration of the emitted signature signal. In a particular embodiment, a power splitter being between the frequency splitter and the emitting device, a gain corresponding to the attenuation due to this power splitter is applied for position of the sliding window corresponding to reflexion point behind the power splitter.

The invention further comprises a method for tracking the variation of the nominal wavelength of components with Mach-Zehnder topology in a frequency splitter over time characterized in that a coupling method as described is applied on a regular basis. The characteristics of the invention will emerge more clearly from a reading of the following description of an illustrative embodiment, the said description being produced with reference to the accompanying drawings, among which:

Figure 1:
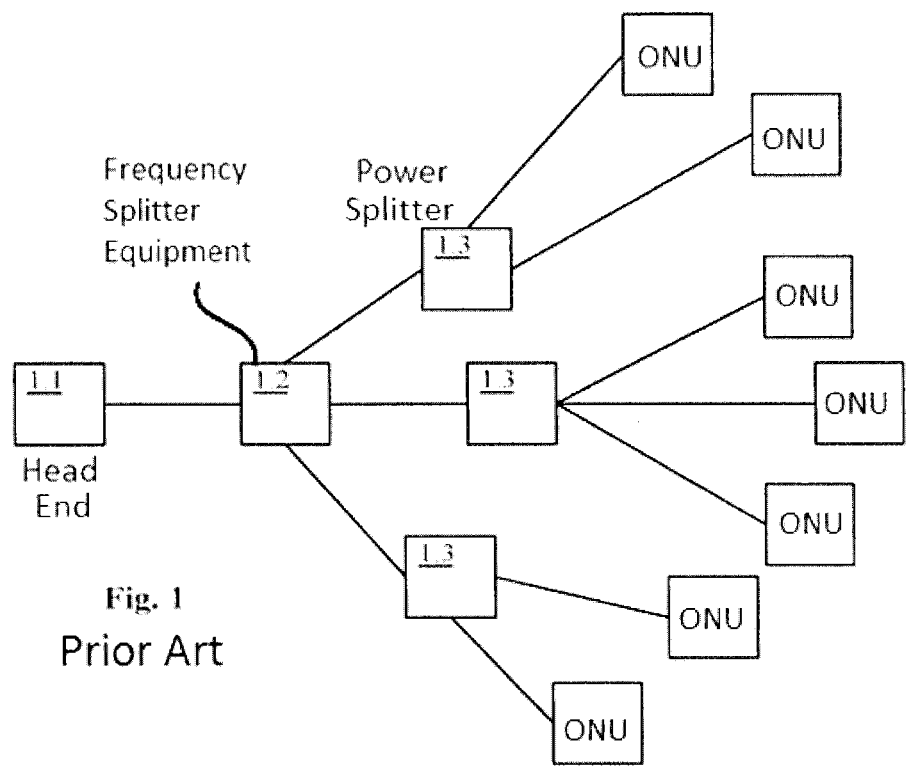
FIG. 1 illustrates the typical architecture of a PON.
Figure 2:
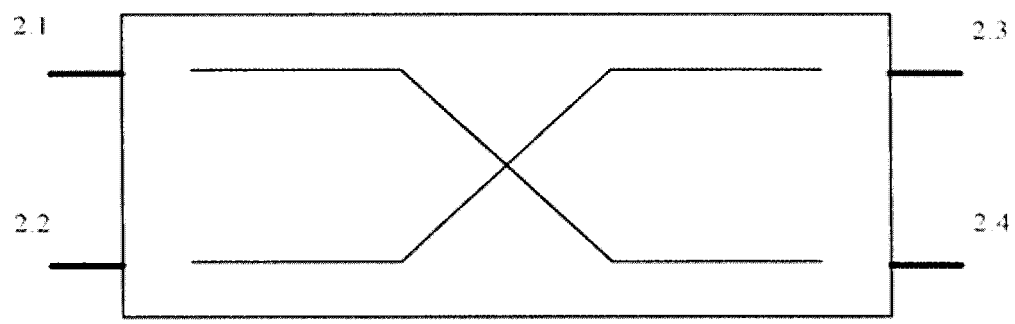
FIG. 2 illustrates the Mach-Zehnder component.
Figure 3:
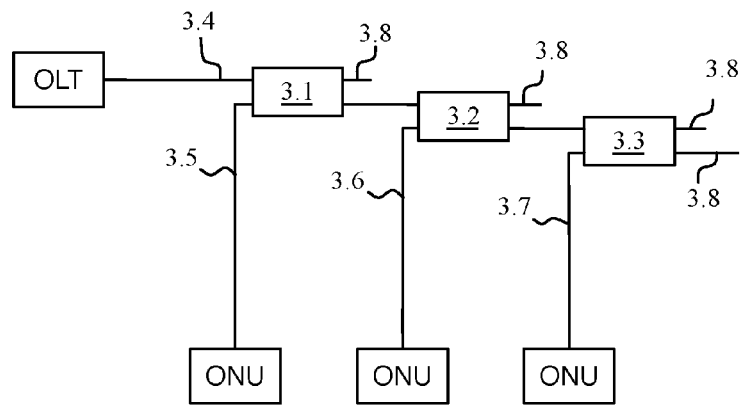
FIG. 3 illustrates the Mach-Zehnder based passive frequency splitter in a PON.

FIG. 3 illustrates the Mach-Zehnder based passive frequency splitter in a PON. Some Mach-Zehnder components 3.1, 3.2 and 3.3 are daisy chained. The number of components depends on the number of wavelengths in the input signal that we want to extract. A signal 3.4 comes from the OLT. This signal is a multiplex of several bands, each using a particular wavelength. We suppose in the illustrated example that the signal is a multiplex of 3 different bands with wavelengths L1, L2 and L3. The first Mach-Zehnder component has a nominal wavelength of L1. It results that the signal using wavelength L1 is extracted on port 3.5 toward a first ONU or set of ONUs by using a power splitter. Other wavelengths of the input signal, namely L2 and L3 are output toward the second Mach-Zehnder 3.2 which nominal wavelength is L2. It results that the signal of wavelength L2 is extracted on port 3.6 toward an ONU or a set of ONUs. The last signal using L3 is output toward Mach-Zehnder 3.3 which nominal wavelength is L3 and thus extracted on port 3.7 toward an ONU or a set of ONUs. Ports 3.8 of the Mach-Zehnder components are unused.

There are many other alternatives to build an Optical Add-Drop Multiplexer having the same topology as the Mach-Zehnder component. A first example of such component is based on a Fiber Bragg gratings surrounded with two optical circulators like the one described in US patent published with U.S. Pat. No. 5,909,310. A second example is based on free space optics as illustrated by US patent published with U.S. Pat. No. 6,198,857. The present document focuses on frequency splitters based on Mach-Zehnder component but the invention applies on all frequency splitters based on components with the Mach-Zehnder topology.

There are two solutions for the return path or uplink. One can use the same wavelength in both directions. Signals coming from the ONU toward the OLT using the same wavelength will be added to the signal by the Mach-Zehnder components and multiplexed in the output signal that goes to the OLT.

Another solution is to use a different set of wavelengths for the uplink. In this case, one can use Mach-Zehnder components having two different nominal wavelengths. These components are built replacing the FBGs inside by two FBGs each having a nominal wavelength that fits one of the desired wavelengths.

Such passive frequency splitter works well as long as the different wavelengths are well defined and does not drift over time. This means that the frequency splitter should be set up in a temperature controlled environment to avoid the drift of the nominal wavelength of the components due to temperature changes.

To be able to relax the constraint of controlling the temperature, the invention proposes a device and a method to be able to estimate the nominal wavelength of each component inside the frequency splitter from each side of the transmission, namely from the OLT and the ONU.

Figure 4:
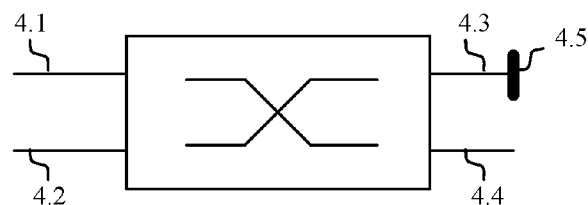
FIG. 4 illustrates the behavior of a Mach-Zehnder component with a mirror according to the invention.

To achieve this, it is proposed to set up a mirror on each unused port 3.8 of the Mach-Zehnder components. FIG. 4 illustrates the behavior of such a component. Regarding a downlink signal on port 4.1, the port 4.3 is unused. Regarding the uplink signal incoming on port 4.2, the nominal wavelength is reflected on port 4.1 while other wavelengths are output on port 4.3. Then, due to the mirror 4.5, the uplink signal is reflected and enters the component again on port 4.3. As the wavelength is different from the nominal one; it goes through the component and output on port 4.2 toward the ONU. It comes that a signal sent by the ONU on port 4.2 is reflected to the emitter but the nominal wavelength that is extracted on port 4.1. We talk of mirrors but any reflective means could be used as soon as they reflect a part of all signals independently of the wavelength used.

Figure 5:
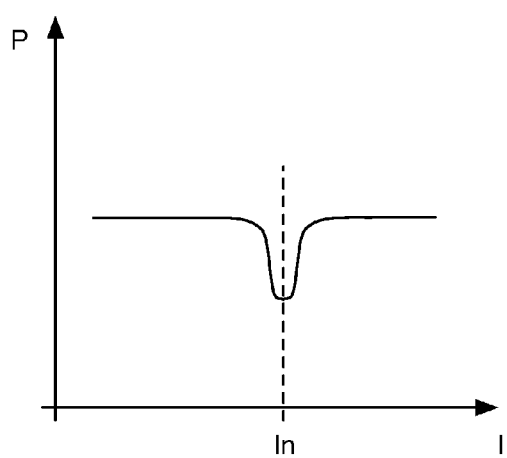
FIG. 5 illustrates the spectral response of the reflected signal emitted by an ONU.

It comes that an ONU that needs to find out the nominal wavelength of a Mach-Zehnder component can do a scan of the wavelengths. All the wavelengths but the nominal one will be reflected to the emitter. Then measuring the reflected signal allows determining the nominal wavelength of the component. FIG. 5 illustrates the spectral response of the reflected signal. The wavelength I of the emitted signal is on the abscissa and the power P of the reflected signal on the Y-axis. The power of the reflected signal is maximum but for the nominal wavelength In for which it is minimum.

It comes that placing a mirror on 4.3 port of each Mach-Zehnder component of the passive frequency splitter enables all ONUs to determine the nominal wavelength of the component to which they are connected.

Figure 6:
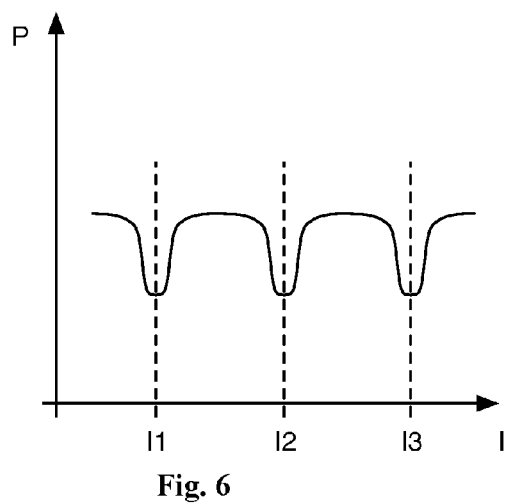
FIG. 6 illustrates the spectral response of the reflected signal emitted by an OLT.

Symmetrically, placing a mirror on the unused 4.4 port of the last Mach-Zehnder component 3.3 of the frequency splitter allows the OLT to do the same. The only difference is that there will be as many holes in the spectral response of the reflected signal that there are Mach-Zehnder components in the frequency splitter. Only wavelengths that are different from all the nominal wavelengths of the Mach-Zehnder components will go through all of them to reach the mirror placed on the 4.4 port of the last one and be reflected to the emitter, here the OLT, while a signal having the wavelength of one of the Mach-Zehnder components will be extracted and will not be reflected toward the OLT. FIG. 6 illustrates the spectral response of the reflected signal by the OLT. Each Hole corresponds to the nominal wavelength, l1, l2 or l3, of one of the extracting components.

The invention is based on using such modified passive frequency splitter equipped with mirrors on all the otherwise unused ports of the Mach-Zehnder components. It is advantageously coupled with end communicating device equipped with means to scan a band of wavelengths to determine the effective nominal wavelength of each Mach-Zehnder components at the moment. The communicating device is also equipped with means to adjust the wavelengths used in communication, called its operating level, to those measured during the scan. For an emitting device emitting a signal over a single band of wavelength, this wavelength is called its operating level. For an emitting device emitting a signal multiplexing multiple bands using different wavelengths, the set of used wavelengths forms a set of operating levels. Advantageously the steps of measure and adjustment are done periodically for monitoring the drift due to temperature of the passive frequency splitter.

It should be understood that the emitter and the receiver could also be subject to drift. Due to the fact that the frequency splitter is passive and cannot therefore adjust its operating level, the adaptation of the operating level of the emitter and/or receiver will allow them to adjust themselves to the frequency splitter. In this process the drift of all the elements is corrected.

According to the actual setup of the network, some problems could occur due to the attenuation of the reflected signal to be measured and to dazzle operation due to splicing generating unwanted back reflection close to the emitter.

The propagation range of the reflected signal is in the worse case twice span of the network. As contemplated networks could be 40 km long and include a power splitter, attenuation could reach typically around 65 dB. Advantageously, the emitted power is the maximum emitted power allowed for an ONU while exchanging data. It comes that the reflected signal to detect is weak as compared to the noise sources in the detector. We have typically to face shot noise, Johnson noise that is a thermal noise dependent on the circuit and dark current of photodiode. Flicker noise can be neglected for frequencies under 10 KHz.

In such a situation, special attention should be paid to be able to detect the reflected signal and to discriminate it from eventual splicing back reflection. The direct detection is not reasonable. Instead, modulation-filtering or synchronous detection are two perfectly suited solutions. Filtering and discrete estimation can also be contemplated.

Figure 7:
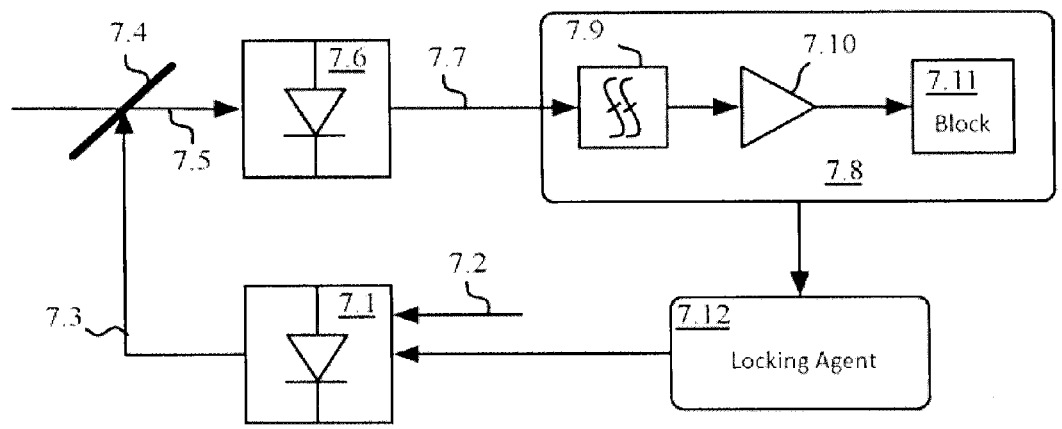
FIG. 7 illustrates the detection scheme based on the modulation filtering solution.

FIG. 7 illustrates the modulation filtering solution. The emitter sends an optical signal 7.3 using a photodiode 7.1 based on a carrier 7.2 taking the form of $\cos(\Omega t)$.

This optical signal 7.3 takes the form of $P_s = \cos(\Omega t) p_s$, where $p_s$ is the emitting power.

The signal is reflected by the mirror 7.4 and comes back to the emitter in attenuated form 7.5 $s = P_s e^{-\alpha L - \beta N}$, where $e^{-\alpha L}$ is due to propagation loss and $e^{-\beta N}$ due to other losses. This received signal is transformed back to an electrical signal 7.7 by the photodiode 7.6. The received electrical signal is in the form:

$i(t) = e^{-\alpha L - \beta N} p_s \cos(\Omega t) + b(t);$

It comes that the problem is to detect the attenuated signal from the noise $b(t)$.

The solution is based on using a modulation and filtering block 7.8. This block achieves an integration of the received signal by the integrator 7.9 to eliminate the mean of the black current. This is followed by an amplification 7.10 while the block 7.11 realizes an estimation. Advantageously this estimation is done over several realizations in case the level of the expected signal is low compared to noise.

A locking agent 7.12 which controls the emitter uses the filtered result of this block. This allows achieving the scan of the desired bandwidth of wavelength to determine the hole in the received signal and thus the nominal wavelength of the Mach-Zehnder component.

Figure 8:
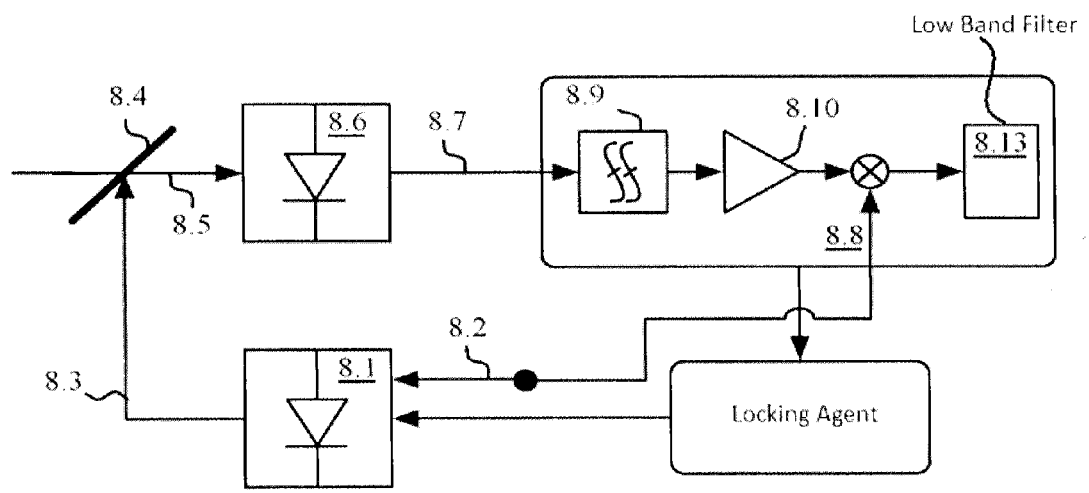
FIG. 8 illustrates the detection scheme based on synchronous detection.

Alternatively a solution based on synchronous detection could be used as illustrated on FIG. 8. Corresponding references apply to corresponding element by default. The generated signal 8.3 is slightly different and is expressed in the form:

$S_s = s_s \cos(\Omega t) \cos(\omega_s t + \phi_s);$

The output of the amplifier 8.10 is then multiplied by the $\cos(\Omega t)$ signal before a low band filter 8.13 to achieve the synchronous detection.

Alternatively the module 8.13 could consist in an integrator.

In some embodiment of the invention, dazzle could become an issue. A typical PON as contemplated in this document is sketched on FIG. 9. An OLT 9.1 is connected to a frequency splitter 9.2 according to the invention meaning it comprises mirrors on unused port. It is connected to a power splitter 9.3 and finally to an ONU 9.4. The length of the complete chain from the OLT to the ONU could reach 40 km. Splicing in this chain could be the source of reflected signal with an attenuation up to 26 dB according to norm IEEE802.3av. A signal emitted by the OLT could therefore be reflected back to it with −26 dB by a splicing that can be close to it as illustrated by the 9.5 signals on the figure. Same configuration can occur for a signal emitted by the ONU illustrated by the 9.6 signal. In comparison, the signal received due to the reflection introduced in the frequency splitter 9.2 with references 9.7 and 9.8 is subject to attenuation between 20 and 28 dB due to the typical distance between the OLT and the filter and between 62 to 70 dB due to the distance and the power splitter for the ONU. The given ranges of attenuation values are for wavelength of the signal from 1550 nm to 1310 nm. The power splitter itself is typically the source of an attenuation of 40 dB.

Considering the dazzle for a signal emitted by the OLT, it comes that the reflected signal from a close splice and the reflected signal from the frequency splitter we need to detect are subject to similar values of attenuation. In order to allow discriminating between the reflected signal by the frequency splitter and unwanted back reflection due to splices, it is proposed to define a sliding temporal window for the detection of the reflected signal. The solution is based on the propagation time of the signal. The emitted signal is a signature of sufficiently short duration. A sliding temporal window is defined to detect the reflected signal. The beginning and the width of the temporal sliding window allow focusing on the detection of the reflected signal to reflexion located in a particular part of the transmission path depending on the propagation time of the signal. This is illustrated on FIG. 10, which represents the time on the abscissa and the power of the received signal on the Y-axis. T0 is the time of the beginning of the emission of the signature. The duration of this signature is chosen small enough to stop the emission before receiving the reflected signal by a close splice as 9.5 on FIG. 9. The time t1 is the beginning of the reception of the reflected signal 10.1 from a close splice. This reception has a power level corresponding to the emitted one minus 26 dB, the attenuation is only due to the splice, the route of the signal being very short. 10.2 is a reflected signal by a splice close to the frequency splitter. Its reception begins at time t2. The signal is low because it is subject to attenuation from the splice and from the route of the signal. 10.3 is the searched reflected signal from the frequency splitter. Its power is higher than the power of signal 10.2 because the only attenuation is due to the route. 10.4 represents the sliding window. By moving the sliding window from T0 to a maximum corresponding to the round trip time of the total transmission path from the OLT to the ONU coupled with an AGC (Automatic Gain Control), it is possible to get the expected signal.

Advantageously, the gain will be adapted to compensate the attenuation due to the length of the path. This could be done by using a gain corresponding to the following formula:

$$G = e^{2\alpha \times \frac{c}{\eta} \times (t1-t0)};$$

with ∝ being the linear attenuation coefficient of the fiber, and η the material index, t1 being the moment of the beginning of the window.

Figure 11:
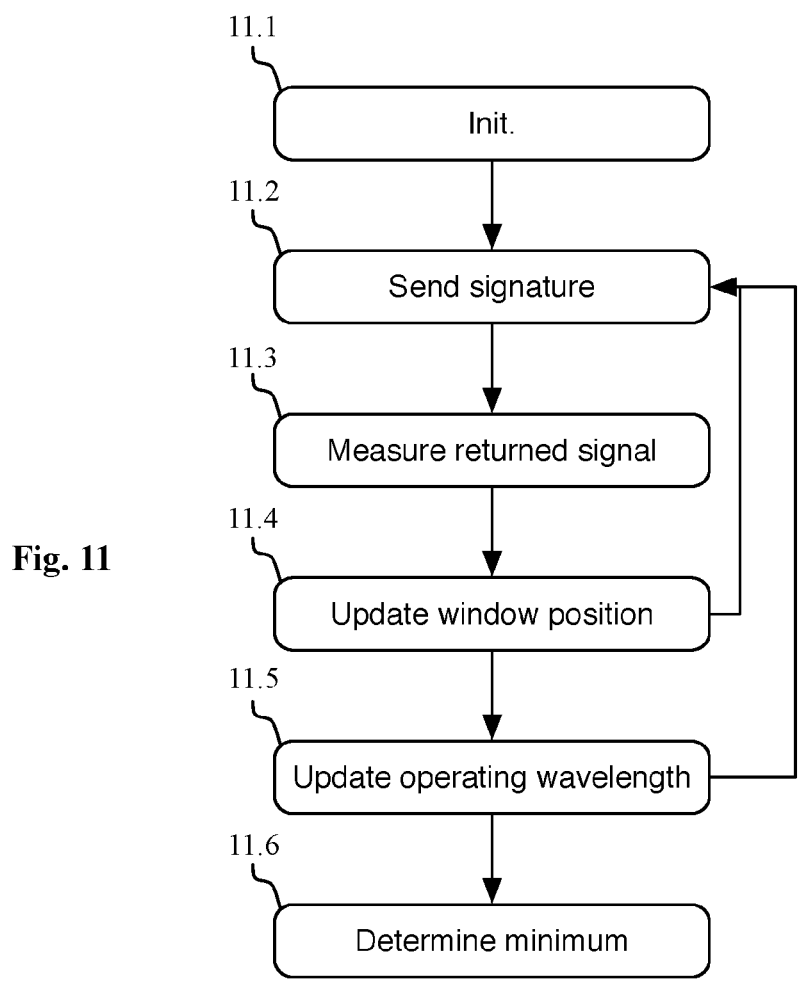
FIG. 11 illustrates the detection method.

FIG. 11 illustrates an illustrative embodiment of the method to determine the nominal wavelength of the frequency splitter to be used for the communication. Any end device using an optical transmission comprising a frequency splitter according to the invention could use this method. Namely in the illustrative embodiment it is used by the OLT and the ONU.

In a first step 11.1 the system is initialized. The OLT, for example, sets its operating level, meaning the wavelength of the emission signal at the lowest level, and the beginning of the temporal sliding window is also set to its minimum, typically the end of the signature emission. In some embodiments, especially in case of tracking where the temporal location of the frequency splitter is already known, the extent of the search could be advantageously reduced around this known location.

In a second step 11.2, the device emits the signature.

In a third step 11.3, the returned signal power is measured over the temporal sliding window. We estimate the presence of the expected signal. Typically the width of the temporal sliding window is set to the duration of the signature, but other values could be used.

In a step 11.4, the position of the temporal sliding window is updated. If the position of the temporal sliding has reached its extent, it is reinitialized to its minimum and we go to step 11.5. Else, the temporal sliding position is incremented, the used step is typically of the width of the window, but lower values could be used.

In step 11.5, when a complete range of temporal sliding window has been explored for a given wavelength, this wavelength is incremented. The position of the temporal sliding window is reinitialized. Then the process of temporal exploration is resumed by going back to step 11.2. In some embodiments, especially in case of tracking where the former value of the wavelength is already known, the extent of the search could be advantageously reduced around this known value.

While the complete range of wavelength has been explored, the spectral location of the minimum is estimated. This could be done by linear regression for example. The operational level of the device is set to this found value and the emitting device and the frequency splitter are coupled. In case of the OLT that is emitting a multiplexed signal comprising bands on several wavelengths, we can talk of a set of operating levels. These operating levels correspond to multiple minimums detected in the power of the return signal as illustrated by FIG. 6. In this case the set of operating levels is set to the set of operating levels for which the power of the reflected signal is minimum.

Figure 9:
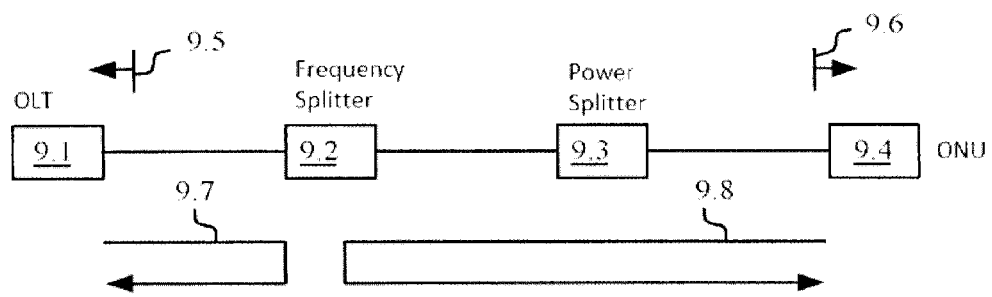
FIG. 9 illustrates the typical transmission chain.
Figure 10:
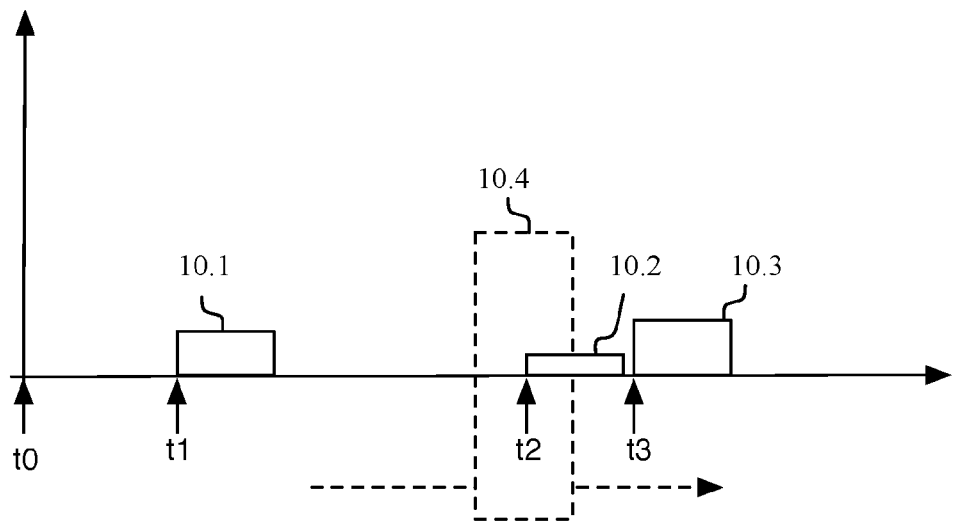
FIG. 10 illustrates the sliding window mechanism.

As illustrated by FIG. 9, there is typically a power splitter 9.3 between the frequency splitter and the ONU. It comes that, when applied by the ONU, the expected reflected signal by the frequency splitter is behind the power splitter. The emitted signature by the ONU is then subject to the further attenuation of the power splitter on its return path. This attenuation is typically 40 dB in our illustrative embodiment. In some cases, it could happen that the expected signal is not detected by the method described above. In such case, advantageously, a further step could be used. The location of the power splitter is determined from the last detected signal that is likely to be due to splicing reflexion at the input of the power splitter. The transmission chain behind the power splitter is then explored by initialising the sliding window just behind the power splitter, meaning just after the last detected signal. A gain corresponding to the attenuation due to the power splitter is then applied to the emitted signature. The exploration of the part of the range of position of the sliding window corresponding to the part of the transmission chain behind the power splitter is then undertaken with these new initial values.

This allows to apply a different value of gain to explore the first part between the ONU 9.4 and the power splitter 9.3 and the second part between the power splitter 9.3 and the frequency splitter 9.2. Therefore a gain corresponding to the attenuation due to this power splitter is applied for position of the sliding window corresponding to reflexion point behind the power splitter.

Advantageously, for tracking the variation of the nominal wavelength of the Mach-Zehnder components over time, this coupling method is applied on a regular basis.

The invention could be used in various cases as soon as an optical transmission is set up between at least two devices. This transmission using WDM technologies, these wavelengths being extracted by a frequency splitter with a topology similar to the topology of the said Mac Zhender component.

The invention claimed is:

1. A system comprising:
    an emitting device and a frequency splitter, wherein:
        the frequency splitter includes:
            at least one component with a Mach-Zehnder topology, and, in a case of plural components, the plural components are daisy chained, wherein
            the at least one component with the Mach-Zehnder topology comprising:
                an input port to receive an input signal;
                an extracting port to output a band of the input signal corresponding to a nominal wavelength of the at least one component;
                an output port to output the input signal except for the outputted band, the output port being connected to the input port of a next component if any or being unused for a last component of the daisy chain or an only component;
                an add port which is unused; and
                all unused ports of the at least one component with the Mach-Zehnder topology of the frequency splitter include a reflecting member;
        the emitting device configured to use one operating level or a set of operating levels for transmitting signals to a receiving device via the frequency splitter, and
        the emitting device is connected to the input port or the extracting port of one of the plural components with the Mach-Zehnder topology or the at least one component with the Mach-Zehnder topology, and the emitting device is configured to determine at least one operating level by measuring a signal reflected by the frequency splitter.

2. A method for coupling an emitting device to a frequency splitter, the emitting device using one operating level or a set of operating levels for transmitting signals to a receiving device via the frequency splitter, the frequency splitter comprising:
at least one component with a Mach-Zehnder topology, and, in a case of plural components, the plural components are daisy chained, wherein
the at least one component with the Mach-Zehnder topology comprising:
an input port to receive an input signal;
an extracting port to output a band of the input signal corresponding to a nominal wavelength of the at least one component;
an output port to output the input signal except for the outputted band, the output port being connected to the input port of a next component if any or being unused for a last component of the daisy chain or an only component;
an add port which is unused;
all unused ports of the at least one component with a the Mach-Zehnder topology of the frequency splitter include a reflecting member in order to reflect all incoming signals; and
the emitting device is connected to the input port or the extracting port of one of the plural components with the Mach-Zehnder topology or the at least one component with the Mach-Zehnder topology, the emitting device being further configured to determine at least one operating level by measuring a signal reflected by the frequency splitter.

3. The method according to claim 2, wherein:
the emitting device performs a first set of operations including:
initializing an operating level to a first wavelength;
sending a signature signal toward the receiving device using the operating level; and
measuring power of a signal received in response to the signature signal, to estimate a presence of a signal reflected by the frequency splitter, the first set of operations being repeated over a band of operating levels; and
the emitting device further performs:
determining the operating level, or the set of operating levels, for which the power of the received signal is minimum; and
setting the operating level, or the set of operating levels, to the determined operating level, or operating levels, for which the power of the received signal is minimum.

4. The method according to claim 3, wherein the measuring the power of the received signal is performed by modulation and filtering.

5. The method according to claim 3, wherein the measuring the power of the received signal is performed by synchronous detection.

6. The method according to claim 3, wherein the measuring the power of the received signal comprises:
defining a temporal sliding window;
measuring the power of the received signal over the temporal sliding window; and
moving the temporal sliding window in a range from an origin to a maximum corresponding to a round trip time of a total transmission path between the emitting device and the receiving device, the moving of the temporal sliding window being coupled with an automatic gain control in order to get the signal reflected by the frequency splitter.

7. The method according to claim 6, wherein a width of the temporal sliding window is chosen to be equal to a duration of the sent signature signal.

8. The method according to claim 6, wherein a power splitter is placed between the frequency splitter and the emitting device, and a gain corresponding to an attenuation due to the power splitter is applied for a position of the sliding window corresponding to a reflection point behind the power splitter relatively to a position of the emitting device on the total transmission path.

9. A method for tracking over time variation of at least one nominal wavelength of at least one respective component with a Mach-Zehnder topology in a frequency splitter, wherein a coupling method according to claim 2 is applied on a regular basis.

* * * * *